United States Patent [19]
Kawazu et al.

[11] Patent Number: 5,793,454
[45] Date of Patent: Aug. 11, 1998

[54] LIQUID CRYSTAL DISPLAY DEVICE AND METHOD FOR PRODUCING THE SAME

[75] Inventors: Naoko Kawazu, Kitakatsuragi-gun; Shinji Shimada, Kashihara, both of Japan

[73] Assignee: Sharp Kabushiki Kaisha, Osaka, Japan

[21] Appl. No.: 684,691

[22] Filed: Jul. 22, 1996

Related U.S. Application Data

[62] Division of Ser. No. 401,780, Mar. 10, 1995, Pat. No. 5,576,856.

[30] Foreign Application Priority Data

Mar. 17, 1994 [JP] Japan ................... 6-047427

[51] Int. Cl.⁶ .................. G02F 1/1333; G02F 1/1337
[52] U.S. Cl. ............................... 349/92; 349/191
[58] Field of Search ................................ 349/191, 183, 349/86, 92, 88, 89

[56] References Cited

U.S. PATENT DOCUMENTS

| | | | |
|---|---|---|---|
| 4,944,576 | 7/1990 | Lacker et al. | 359/51 |
| 5,073,294 | 12/1991 | Shannon et al. | 359/96 |
| 5,296,952 | 3/1994 | Takatsu et al. | 359/52 |
| 5,305,126 | 4/1994 | Kobayashi et al. | 359/51 |
| 5,464,669 | 11/1995 | Kang et al. | 359/75 |
| 5,473,450 | 12/1995 | Yamada et al. | 359/52 |

FOREIGN PATENT DOCUMENTS

| | | | |
|---|---|---|---|
| 326248 | 8/1989 | European Pat. Off. | 359/51 |
| 61-221728 | 10/1986 | Japan . | |
| 4-212928 | 8/1992 | Japan . | |
| 4-338923 | 11/1992 | Japan . | |
| 85/03944 | 9/1985 | WIPO | 359/51 |
| 89/06264 | 7/1989 | WIPO | 359/51 |
| 92/14182 | 8/1992 | WIPO | 359/52 |

OTHER PUBLICATIONS

Schadt et al. "Surface–Induced Parallel Alignment of Liquid Crystals by Linearly Polymerized Photopolymers", Jpn. J. Appl. Phys., vol. 31, pp. 2155–2164, 1992.

*Primary Examiner*—William L. Sikes
*Assistant Examiner*—Tiep H. Nguyen
*Attorney, Agent, or Firm*—Nixon & Vanderhye, P.C.

[57] ABSTRACT

The liquid crystal display device of this invention includes: a pair of substrates facing each other and a display medium sandwiched between the pair of substrates. In this liquid crystal display device, at least one of the pair of substrates is a flexible film having polarizer properties and the display medium includes a liquid crystal phase and a polymer phase.

6 Claims, 8 Drawing Sheets

PRIOR ART

FIG.10

PRIOR ART

FIG.11

PRIOR ART

LIQUID CRYSTAL DISPLAY DEVICE AND METHOD FOR PRODUCING THE SAME

This is a divisional of application Ser. No. 08/401,780 filed MAR. 10, 1995, now U.S. Pat. No. 5,576,856 entitled LIQUID CRYSTAL DISPLAY DEVICE AND METHOD FOR PRODUCING THE SAME USING PHOTOPOLYMERIZATION WITH LENEARLY POLARIZED LIGHT.

BACKGROUND OF THE INVENTION

1. Field of the Invention

The present invention relates to a liquid crystal display device (LCD) and a method for producing the same.

2. Description of the Related Art

A display is performed in LCDs by varying the electrooptical properties of the liquid crystal with respect to the orientation of the liquid crystal molecules in accordance with a voltage to be applied to the liquid crystal layer. There are various operating modes for LCDs: a dynamic scattering (DS) mode, a twisted nematic (TN) mode, a guest host (GH) mode, and a polymer dispersed (PD) mode using nematic liquid crystal droplets, for example. In general, these operating modes are roughly classified into two kinds of groups. Modes included in one group utilize the optical rotation phenomena caused by the liquid crystal layer, and modes included in the other group utilize the light scattering phenomena caused by the liquid crystal layer.

Among the LCDs operating in these modes, LCDs which operate in the modes utilizing the scattering phenomena of the light transmitted through the liquid crystal layer do not require polarizing plates for displaying, while LCDs which operate in the modes utilizing the optical rotation properties require a pair of polarizing plates for displaying. For LCDs operating in the GH mode (i.e. LCDs utilizing the anisotropy of the absorption coefficients of the dyes added to the liquid crystal), polarizing plates are required depending on the kind of operating mode of the liquid crystal and the kind of dye to be added. Recently, some LCDs utilizing the light scattering phenomena have polarizing plates so as to improve the viewing angle characteristics thereof.

Figure 9:
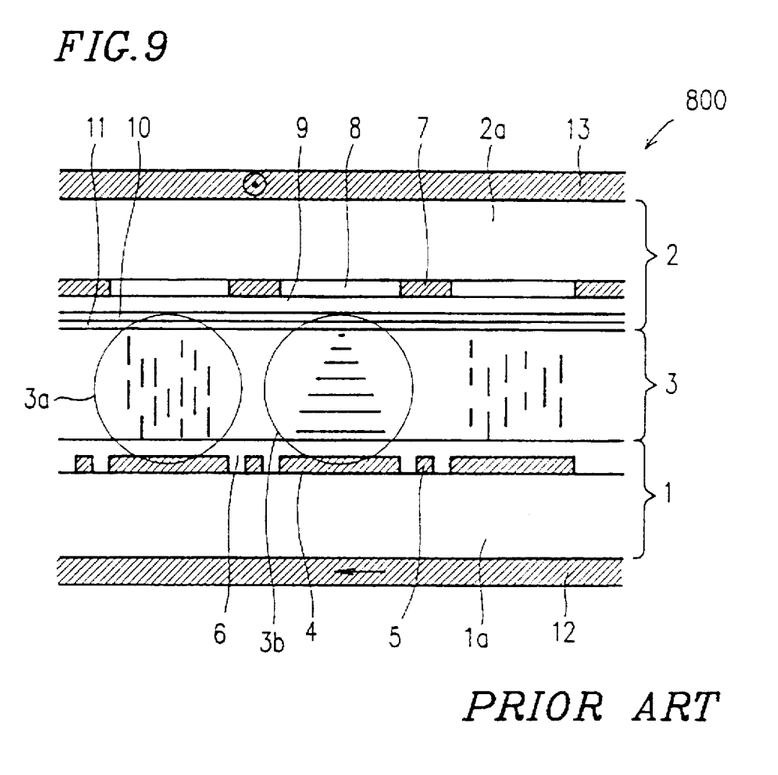
FIG. 9 is a partial cross-sectional view showing an example of a conventional liquid crystal display device.

FIG. 9 shows a typical conventional LCD 800 operating in the TN mode. As shown in FIG. 9, liquid crystal 3 is sandwiched as a display medium between a pair of substrates 1 and 2 facing each other. The substrate 1 has a glass substrate 1a. Pixel electrodes 4, bus lines 5 such as gate bus lines and source bus lines, thin film transistors (TFTs; not shown) and the like are formed on the surface of the glass substrate 1a facing the liquid crystal 3 so that the voltage applied to the liquid crystal 3 can be controlled for each pixel. An alignment film 6 is further formed over the pixel electrodes 4, the bus lines 5, and the like in order to align the liquid crystal molecules of the liquid crystal 3. The substrate 2 has a glass substrate 2a. A black mask 7 and a color filter 8 are formed on the surface of the glass substrate 2a facing the liquid crystal 3, and a protection layer 9 and a transparent electrode 10 are superposed on the black mask 7 and the color filter 8. An alignment film 11 is further formed on the transparent electrode 10 in order to align the liquid crystal molecules of the liquid crystal 3.

The substrates 1 and 2 are provided with polarizing plates 12 and 13 on the respective surfaces of the respective glass substrates 1a and 2a not facing the liquid crystal 3. The two polarizing plates 12 and 13 are disposed so that the transmission axes thereof are orthogonal to each other. Accordingly, the polarizing plates 12 and 13 shut out the light passed through the liquid crystal layer 3a to which a voltage is applied, but transmit the light passed through the liquid crystal layer 3b to which no voltage is applied. Alternatively, LCDs may perform display using a pair of polarizing plates disposed so that the transmission axes thereof are parallel to each other. In such a case, the polarizing plates transmit the light passed through the liquid crystal layer to which a voltage is applied, but shut out the light passed through the liquid crystal layer to which no voltage is applied.

Next, referring to FIG. 10, an LCD 900 for electrically controlling a transparent condition and a scattering condition by using of a multi-refraction of the light will be described below. A display medium 3' for the LCD 900 is composed of nematic liquid crystal droplets 3c dispersed in a polymer binder 3d. The LCD 900 operates based on the following principle. When no voltage is applied, the liquid crystal molecules included in the nematic liquid crystal droplets are in random orientation directions, and strongly scatter the light (a scattering condition), so that the display medium has a white opaque (or translucent) appearance as indicated by the circle 3b'. When a voltage is applied, the orientation directions of the liquid crystal molecules included in the droplets are aligned in a direction of an electric field generated by the voltage. If the ordinary refractive index of the nematic liquid crystal droplets is matched with the refractive index of the polymer serving as a support medium, then the transparent condition as indicated by the circle 3a' can be realized under an application of a voltage. On removing applied voltage, the orientation of each liquid crystal molecule returns into a random direction, so as to be in the light scattering condition (see, for example, "Liquid Crystal Applications and Uses Vol. 1", edited by Birendra Bahadur, World Scientific, p. 362). This kind of LCD conducts a display by shutting and transmitting the light based on an application of voltage in the above-mentioned manner.

For a conventional polymer dispersed liquid crystal display device (PDLCD) described above, polarizing plates are not necessary. However, in order to improve the viewing angle characteristics, an LCD has recently been developed in which the substrates 1 and 2 are sandwiched by a pair of polarizing plates 12 and 13, so that the transmission axes of the polarizing plates 12 and 13 are orthogonal to each other (see, for example, Japanese Laid-Open Patent Publication No. 4-212928).

Hereinafter, a process for producing a conventional liquid crystal display device shown in FIGS. 9 and 10 will be briefly described below. First, on the surface of the glass substrate 1a facing the display medium 3 (or 3'), bus lines 5 for transmitting input signals; TFTs (not shown) for controlling the signals transmitted through the bus lines 5; and pixel electrodes 4 for applying a voltage to the display medium 3 (or 3') are formed. On the other hand, on the surface of the counter glass substrate 2a facing the display medium 3 (or 3'), a black mask 7 for preventing the leakage of the light; a color filter 8 for color display; a protection layer 9 for protecting the color filter 8; and a transparent electrode 10 for applying a voltage to the display medium 3 (or 3') are formed.

In the LCD 800 operating in the TN mode shown in FIG. 9, polyimide is printed on the substrates 1a and 2a, and then the printed polyimide is rubbed to form alignment films 6 and 11 for aligning the liquid crystal molecules. In this way, each of the substrate 1 and the counter substrate 2 is formed.

Figure 11:
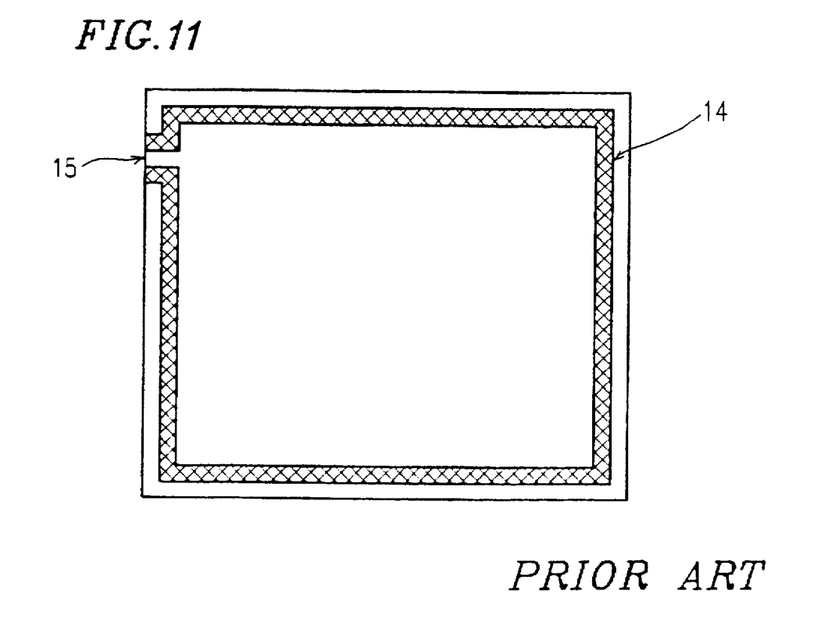
FIG. 11 is a view showing a pattern of a seal member on a substrate of a conventional liquid crystal display device.

Next, the substrate 1 and the counter substrate 2 are attached to each other. In the peripheral portion of either one of the substrates 1 and 2, a photocurable resin or a thermosetting resin is applied, thereby forming a seal member 14. An injection hole 15, from which liquid crystal is to be filled later, is provided in the seal member 14 as shown in FIG. 11. Subsequently, the substrates 1 and 2 are disposed so as to be opposed to each other. Gap materials (not shown) are provided between the substrates 1 and 2 for obtaining a desired cell gap. The seal member 14 is cured by irradiating the light through the substrates 1 and 2 onto the seal member 14 or by heating the substrates 1 and 2. After that, a display medium such as liquid crystal is injected through the injection hole 15, and then the injection hole 15 is closed.

Figure 10:
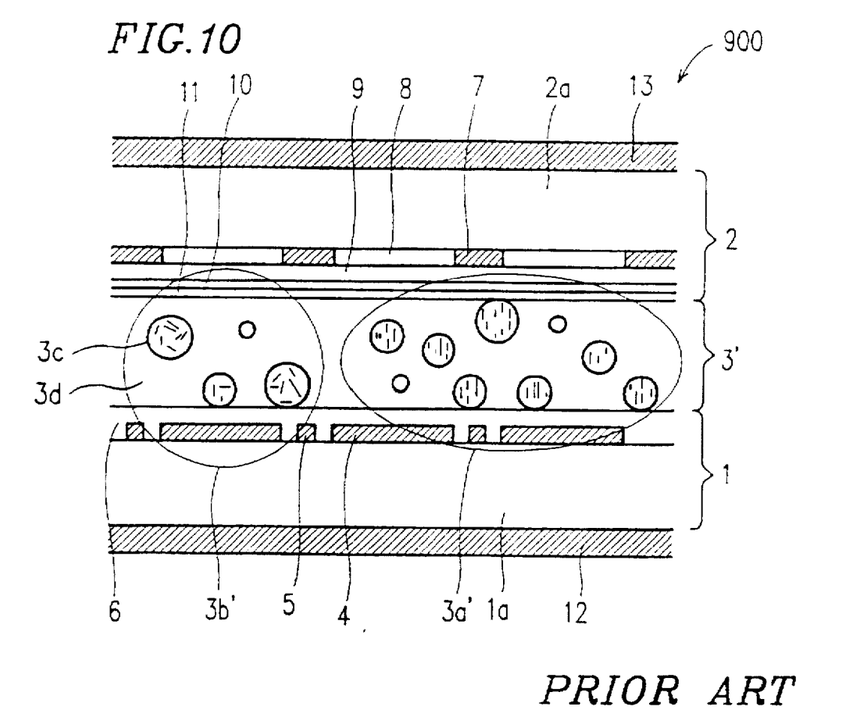
FIG. 10 is a partial cross-sectional view showing another example of a conventional liquid crystal display device.

Into the LCD 900 shown in FIG. 10, a homogeneous solution of photopolymerizable prepolymer (monomer or oligomer) with a liquid crystal is injected. In the same manner as in the LCD 800, the injection hole 15 is closed, and then the light is irradiated through the substrates 1 and 2, thereby allowing the prepolymer to polymerize and form a polymer phase $3d$ and a liquid crystal phase $3c$ (polymerization induced phase separation). Then, polarizing plates 12 and 13 are placed on the outer surfaces of the assembled substrates 1 and 2 in a manner that the transmission axes thereof are orthogonal to each other.

As described above, LCD substrates are conventionally made of glass. However, in these days, a flexible film is also used instead of a glass. Since a flexible film is thinner, lighter and less breakable than glass, an LCD having the substrates made of such a film can be thinner, lighter and less breakable.

In general, the polarizing plates are additionally attached to the LCD at the final production step. However, Japanese Laid-Open Patent Publication No. 61-221728 proposed an LCD having a substrate having polarization properties which are obtained by integrating a polarizing plate with the substrate. In this device, a dichroic dye is added to a polyester resin, and then the polyester resin is uniaxially extended, thereby forming a polarizing polyester film. After that, a transparent pixel electrode and a color filter are formed on a surface of the polyester film so as to form a counter substrate for the LCD. As a result, a number of layers required for constructing a substrate of such an LCD is reduced. This makes an LCD device thinner in size and its fabrication simple. In addition, such a device may provide a brighter display.

SUMMARY OF THE INVENTION

The liquid crystal display device of the invention includes: a pair of substrates facing each other; and a display medium sandwiched between the pair of substrates.

In the liquid crystal display device, at least one of the pair of substrates is a flexible film having polarizer properties and the display medium includes a liquid crystal phase and a polymer phase.

In one embodiment, the polymer phase includes polymer layer portions formed on each inner surface of the pair of substrates; the polymer layer has an anisotropy, whereby liquid crystal molecules contained in the liquid crystal phase are aligned.

In another embodiment, a direction of the anisotropy of the polymer layer portions is parallel to a direction of a polarization axis of the flexible film.

In still another embodiment, the liquid crystal display device further includes a shielding layer for cutting ultraviolet light on at least one outer surface of the pair of substrates.

According to another aspect of the invention, a method for producing a liquid crystal display device including: a pair of substrates, at least one of which is a flexible film having polarizer properties; and a display medium sandwiched between the pair of substrates is provided. The method includes the steps of: disposing the pair of substrates so as to face each other; injecting a mixture solution including liquid crystal and photopolymerizing prepolymer into a gap between the pair of substrates; and phase separating for forming a liquid crystal phase and a polymer phase by applying light to the mixture solution through the flexible film and polymerizing the prepolymer so as to generate a polymer binder. According to the method, the light used in the step of applying light is linearly polarized in a direction parallel to a direction of a transmission axis of the flexible film.

In one embodiment, the phase separation step includes: a first irradiation step of applying the polarized light only to portions for forming the polymer phase by using a photomask, thereby photopolymerizing the prepolymer by a ratio equal to or larger than 90% and less than 100%; and a second irradiation step of applying the polarized light without the photomask, thereby photopolymerizing the remaining prepolymer and forming a polymer layer on a surface of the flexible film.

In another embodiment, the polymer layer is formed by conducting the second irradiation step so that the polymer layer has an anisotropy in a direction along the polarization axis of the polarized light.

In still another embodiment, the step of disposing the pair of substrates includes a step of attaching the pair of substrates to each other with a seal member made of photocurable resin.

In still another embodiment, the photocurable resin used as the seal member is cured by applying light which is linearly polarized in a direction parallel to the transmission axis of the flexible film.

In still another embodiment, a wavelength of the light is shorter than 450 nm.

In still another embodiment, the method for producing the liquid crystal display device further includes a step of forming a shielding layer for cutting ultraviolet light on at least an outer surface of the pair of substrates after the phase separation step is finished.

Thus, the invention described herein makes possible the advantage of providing a liquid crystal display device and a method for producing the same which includes a substrate of a flexible film having polarization properties, and the polarization properties are not degraded at a light irradiation step of fabrication.

This and other advantages of the present invention will become apparent to those skilled in the art upon reading and understanding the following detailed description with reference to the accompanying figures.

DESCRIPTION OF THE PREFERRED EMBODIMENTS

A conventional method for producing a liquid crystal display device, as described above, includes a step of irradiating the panel with the light for curing the seal member 14 for attaching the pair of substrates 1 and 2 to each other, or for phase-separating the mixed solution into the liquid crystal phase and the polymer phase. These light irradiation steps can be replaced with heating steps if a thermosetting resin is employed as a seal member, or if a thermally induced phase separation is conducted. However, in the case where a flexible film is used as a substrate instead of a glass substrate, it is preferable to conduct a light irradiation step in order to prevent the shrinkage or the deformation of the flexible film owing to the heat applied to the film.

The light used for the light irradiation step mentioned above is required to have a relatively high energy level such as an ultraviolet ray. If the polarizers 12 and 13 are irradiated with such high-energy light, then iodine and dye contained in the polarizers are decomposed or denatured. As a result, the polarization properties thereof are disadvantageously degraded.

In the case where additional polarizers are used in a conventional manner; the polarizers 12 and 13 may be provided on the LCD after attaching the substrates to each other by irradiating the seal member 14 with light, or after phase-separating the mixed solution into the liquid crystal phase and the polymer phase by the light irradiation. Accordingly, the polarizers 12 and 13 are not irradiated with high-energy light. On the other hand, in the case where the substrates 1 and 2 and the polarizers 12 and 13 are integrally formed before performing a light irradiation step, the integrated substrates (the polarizing substrates) are irradiated with a light with relatively high energy. As a result, absorption of such high-energy light by the iodine and the dye contained in the polarizing substrates causes a degradation problem of the polarization properties owing to the decomposition or denaturation and the fading of the iodine and the dye.

In order to solve the above-mentioned problems, the present invention has been developed so as to provide a liquid crystal display device and a production method thereof in which a flexible film having polarization properties is employed as a substrate, and the polarization properties are not degradable at the light irradiation step.

Hereinafter, the present invention will be described by way of illustrative examples with reference to the accompanying drawings. It is noted that the present invention is not limited to the following specific examples.

EXAMPLE 1

Figure 1:
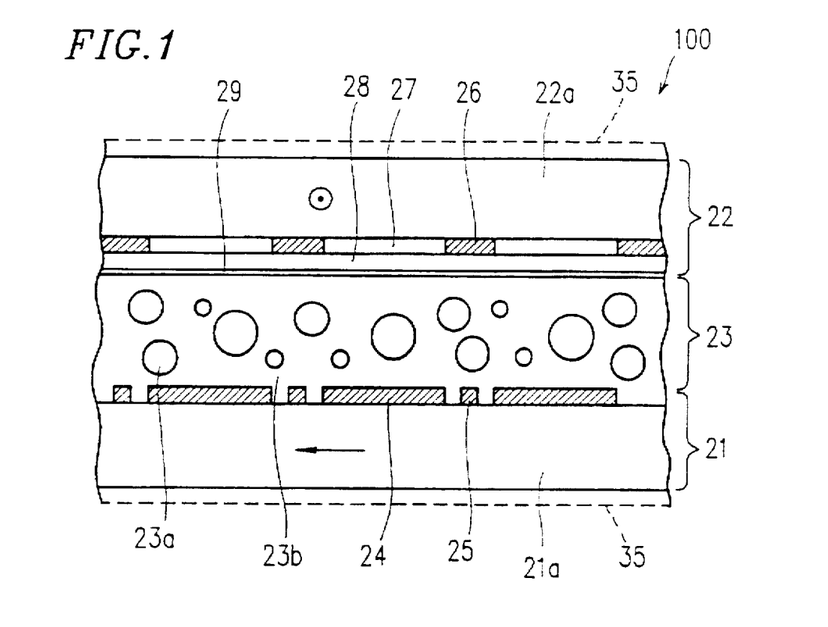
FIG. 1 is a partial cross-sectional view of a liquid crystal display device according to a first example of the present invention.

FIG. 1 shows a partial cross-sectional view of a liquid crystal display device 100 according to a first example of the present invention. As shown in FIG. 1, the LCD 100 includes: a substrate 21; a counter substrate 22; and a display medium 23 sandwiched between the pair of substrates 21 and 22. The display medium 23 includes a liquid crystal phase 23a and a polymer phase 23b. The liquid crystal phase 23a exists as liquid crystal droplets dispersed in the polymer phase 23b. The substrate 21 and the counter substrate 22 respectively have flexible films 21a and 22a having polarization properties as base substrates. The flexible films can be formed by adding iodine or a dye to polyvinylalcohol, acetatecellulose, polyester, polycarbonate, and the like and by uniaxially extending the mixture.

The substrate 21 includes a plurality of pixel electrodes 24 arranged in a matrix fashion and a plurality of bus lines 25 provided vertically and horizontally between adjacent pixel electrodes 24, which are formed on the surface of the flexible film 21a facing the display medium 23. The bus lines 25 include substantially parallel source bus lines provided in the vertical direction and substantially parallel gate bus lines provided in the horizontal direction. The respective pixel electrodes 24 and the corresponding bus lines 25 are electrically connected/disconnected through the TFTs (not shown). A control voltage is applied to each pixel electrode 24 via the TFT.

On the other hand, the counter substrate 22 has the flexible film 22a having polarization properties as a base substrate, and a black mask 26 and a color filter 27 formed on the surface of the flexible film 22a facing the display medium 23. The black mask 26 covers the portions of the flexible film 22a other than those opposed to the pixel electrodes 24 (or the portions opposed to other than the pixel electrodes 24 and the portions opposed to a part of each of the pixel electrodes 24). The color filter 27 is placed on the portions excluding the black mask 26. A protection film 28 and a counter electrode 29 are formed in this order over the black mask 26 and the color filter 27. The substrate 21 and the counter substrate 22, are provided being opposed to each other so that the respective transmission axes (or the polarization axes) of the flexible films 21a and 22a are orthogonal to each other.

Next, a method for producing this liquid crystal display device will be described below.

First, on the surface of the flexible film 21a facing the display medium 23, the bus lines 25 functioning as electrode lines for transmitting signals; the TFTs (not shown) for controlling the signals transmitted through the bus lines 25; and the pixel electrodes 24 for applying a voltage to the display medium 23 are formed. On the other hand, the counter substrate 22 is provided with the black mask 26 and the color filter 27 on the surface of the flexible film 22a facing the display medium 23. Moreover, the protection film 28 and the counter electrode 29 are further formed in this order over the black mask 26 and the color filter 27.

Figure 2:
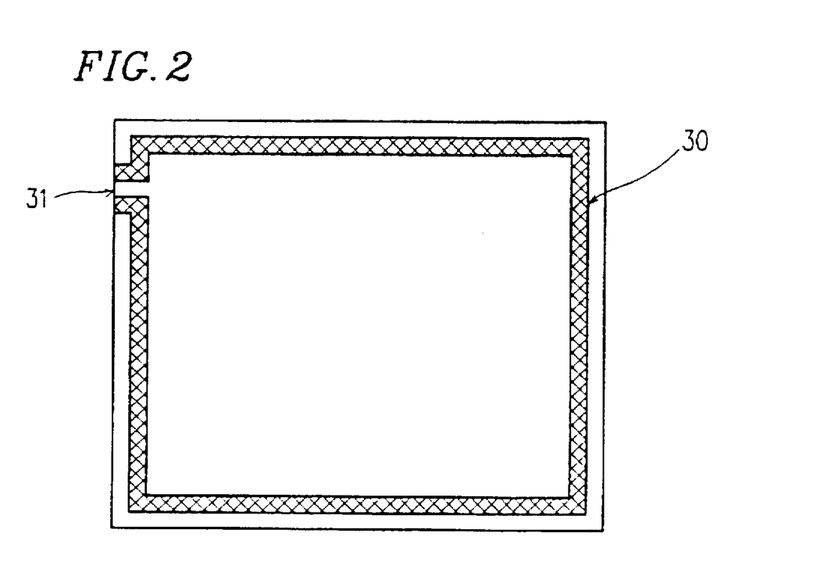
FIG. 2 is a view showing a pattern of a seal member on a substrate of the liquid crystal display device according to the first example.

Then, the substrate 21 and the counter substrate 22 are disposed so as to be opposed to each other, and then attached to each other. As shown in FIG. 2, a photocurable resin is applied to the peripheral portion on the surface of either one of the pair of substrates 21 and 22, thereby forming the seal member 30. An injection hole 31 from which the display medium is to be filled later is formed in the seal member 30. The pair of substrates 21 and 22 are disposed being opposed to each other with gap materials or spacers (not shown) sandwiched between the substrates 21 and 22 so as to obtain a desired cell gap, thereby forming a panel. Thereafter, the seal member 30 is cured by the light irradiation through a substrate.

Figure 3:
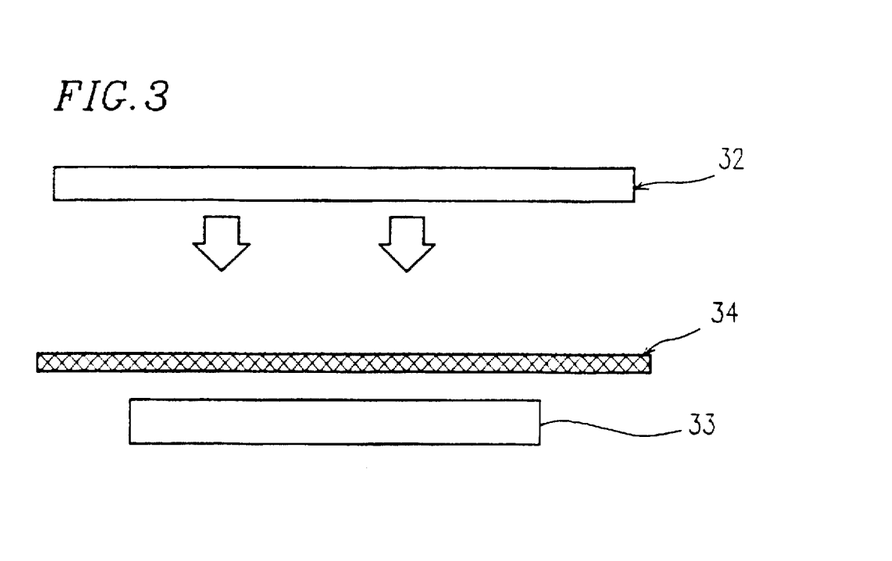
FIG. 3 schematically shows a method for irradiating light at a production step of the liquid crystal display device according to the first example.

This light irradiation step is conducted by using the polarized light. As shown in FIG. 3, a polarizer 34 is placed between a light source 32 and the panel 33. The polarizer 34 is disposed so that the transmission axis of the polarizer 34 is parallel to the transmission axis of one of the flexible films (e.g. the flexible film 22a) in one of the substrates (e.g. the counter substrate 22) of the panel 33 confronting the light source 32. Since the light irradiated to the panel 33 is polarized in the direction of the transmission axis of the counter substrate 22, the irradiated light is not absorbed by the flexible film 22a, and therefore the polarization properties of the flexible film 22a are never degraded.

In this case, it is not preferable that the polarized light which is irradiated from the light source 32 and then transmitted through the polarizer 34 is further irradiated onto the flexible film 21a of the substrate 21 through the counter substrate 22. This is because the transmission axis of the flexible film 21a is orthogonal to the polarization axis of the polarized light. For example, the resin can be cured by irradiating the light in the following manner. A UV-transmitting substrate is used as the polarizing substrate (flexible film) on the light input side, with the direction of the polarization axis of the irradiated light aligning with the transmission axis of the UV-transmitting substrate. A polarizer which is subjected to a UV-cut treatment is used as the other polarizing substrate (flexible film). In general, a polarizer which is not subjected to a UV-cut treatment transmits light having a wavelength shorter than 350 nm (e.g. PMN-18390 manufactured by Nippon Gohsei Kagaku Kogyo K.K.). A polarizer subjected to a UV-cut treatment generally cuts the light having a wavelength equal to or smaller than 400 nm. The cutting wavelength can be controlled in accordance with the kind of the photocurable resin to be used. As a polarizer subjected to a UV-cut treatment, for example, PMN-18392 (also produced by Nippon Gohsei Kagaku Kogyo K.K.) or the like can be used.

In a polarizing substrate subjected to a UV-cut treatment, the UV rays are shielded by protection layers formed so as to sandwich the polarizing layer of the polarizing substrate. Accordingly, even if the light is irradiated in order to cure the resin, the polarization properties of the polarizing layer are not degraded. Examples of a UV-cut agent include: a benzophenone-based agent; a salicylato-based agent; and a benzotriazole-based agent.

In order to cure the photocurable resin, for example, the light may be irradiated from a high pressure mercury lamp having an intensity in the range of several tens mW/cm$^2$ to several hundreds mW/cm$^2$ during a time period of 10 seconds to several minutes.

Next, a homogeneous solution obtained by mixing the liquid crystal and the prepolymer is filled through the injection hole 31, and then the injection hole 31 is closed. After that, the filled solution is irradiated with the light transmitted through the substrate. An ultraviolet lamp is generally employed as the light source. The light irradiation polymerizes the prepolymer, thereby forming a polymer. As the chain length of the polymer molecules becomes longer with the progress of the polymerization reaction of the prepolymer, the solubility of the liquid crystal decreases and the liquid crystal phase is separated. As a result, a polymer phase 23b and a liquid crystal phase 23a are formed.

If the light emitted from the light source is directly irradiated onto the substrate, the light having high energy causes the degradation of the polarization properties of the flexible films 21a and 22a. Accordingly, the light irradiation step is conducted using the polarizer 34 disposed between the light source 32 and the panel 33, as shown in FIG. 3. In this example, a polarizer is employed for obtaining the polarized light. Alternatively, a polarizing prism such as a Glan-Thompson Prism can be employed instead.

In the case where the counter substrate 22 has a black mask, it is preferable to conduct the light irradiation from the substrate 21 side. In the case where the light irradiation is conducted from the substrate 21 side, the flexible film 22a of the counter substrate 22 is subjected to a UV-cut treatment, as described above. If the black mask is not formed in the counter substrate 22, the light irradiation may be conducted from either side.

It is possible to set the wavelength of the light at an arbitrary value in accordance with the kind of polymer to be used and the cell gap. In this example, the prepolymer can be polymerized satisfactorily by using the light with the wavelength set at a value shorter than 450 nm (i.e. a wavelength a little longer than that of a UV ray).

After the light irradiation step for the photopolymerization is finished, ultraviolet ray cut layers 35 may be provided on the surfaces of the flexible films 21a and 22a not facing the liquid crystal phase 23a, in order to prevent the degradation of the liquid crystal because of the ultraviolet rays. The cut layers 35 prevents the degradation by the ultraviolet rays during the operation of the LCD 100, so that the display quality of the LCD 100 is not degraded.

EXAMPLE 2

Figure 4:
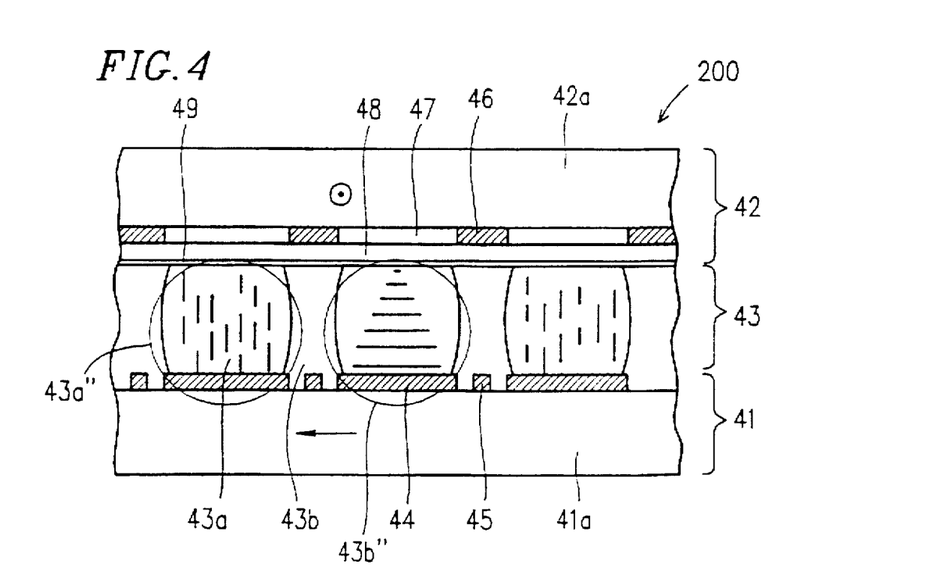
FIG. 4 is a partial cross-sectional view of a liquid crystal display device according to a second example of the present invention.

FIG. 4 shows a partial cross-sectional view of a liquid crystal display device 200 according to a second example of the present invention. As shown in FIG. 4, the LCD 200 includes: a substrate 41; a counter substrate 42; and a display medium 43 sandwiched between the pair of substrates 41 and 42. The display medium 43 includes a liquid crystal phase 43a and a polymer phase 43b. Unlike the case of Example 1, the liquid crystal phase 43a is not in the form of liquid crystal droplets dispersed in the polymer phase 43b, but substantially fills the gap between the pair of substrates 41 and 42.

The substrate 41 and the counter substrate 42 include flexible films 41a and 42a having polarization properties as base substrates. The flexible films may be formed by adding iodine or a dye to polyvinylalcohol, acetatecellulose, polyester, polycarbonate, and the like and by uniaxially extending the mixture.

The substrate 41 includes a plurality of pixel electrodes 44 arranged in a matrix fashion and a plurality of bus lines 45 provided vertically and horizontally between adjacent pixel electrodes 44 on the surface of the flexible film 41a facing the display medium 43. The bus lines 45 include substantially parallel source bus lines provided in the vertical direction and substantially parallel gate bus lines provided in the horizontal direction. The pixel electrodes 44 and the corresponding bus lines 45 are electrically connected/disconnected by the TFTs (not shown). A signal voltage transmitted through the bus lines 45 is applied via the TFTs to each pixel electrode 44.

On the other hand, the counter substrate 42 includes a flexible film 42a having polarization properties as a base substrate, a black mask 46 and a color filter 47 on the surface of the flexible film 42a facing the display medium 43. The black mask 46 covers the portions of the flexible film 42a other than those opposed to the pixel electrodes 44 (or the portions opposed to other than the pixel electrodes 44 and the portions opposed to a part of each of the pixel electrodes 44). The color filter 47 is placed on the portions excluding the black mask 46. A protection film 48 and a counter electrode 49 are formed in this order over the black mask 46 and the color filter 47. The substrate 41 and the counter substrate 42 are provided being opposed to each other so that the respective transmission axes (or the polarization axes) of the flexible films 41a and 42a are orthogonal to each other.

Figure 5:
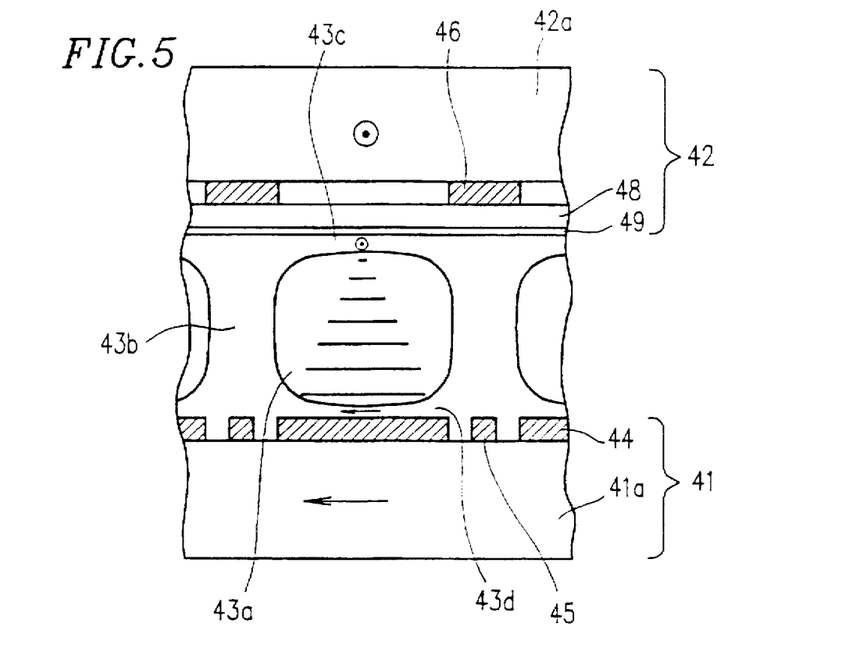
FIG. 5 is a partial cross-sectional view showing in more detail the liquid crystal display device according to the second example of the present invention.

In a portion of the liquid crystal phase 43a in contact with the substrate 41 or the counter substrate 42, a polymer phase is thinly formed between the liquid crystal phase 43a and each substrate (FIG. 5). In FIG. 5, the polymer molecules contained in the thin polymer phase (polymer layer) 43c formed on the counter substrate 42 are oriented in the same direction as that of the transmission axis of the flexible film 42a (In FIG. 5, the direction is indicated as the direction orthogonal to the paper sheet). In a similar manner, the polymer molecules contained in a thin polymer phase (polymer layer) 43d formed on the substrate 41 are oriented in the same direction as that of the transmission axis of the flexible film 41a (In FIG. 5, the direction is indicated as the direction parallel to the paper sheet).

The liquid crystal molecules contained in the liquid crystal phase 43a are aligned by the polymer layers 43c and 43d in a similar manner to the liquid crystal molecules of the TN mode. More specifically, as shown in FIG. 4, when no voltage is applied, all the liquid crystal molecules are aligned in the direction parallel to the substrates. In the portion in contact with one of the substrates, the liquid crystal molecules are aligned in a first direction. The aligning direction of the liquid crystal molecules gradually rotates as the position of the molecules moves towards the other substrate. As a result of the rotation, the liquid crystal molecules are uniformly aligned in the direction orthogonal to the first direction at the portion in contact with the other substrate. In this example, the polarizing plate (or the flexible film having polarization properties) is provided so that the transmission axis thereof is parallel to the orientation direction of the liquid crystal molecules in contact with the corresponding substrate in a similar manner to an LCD operating in the TN mode. Consequently, the liquid crystal phase 43a transmits the light under the condition where no voltage is applied as indicated by a circle 43b" in FIG. 4, but shuts out the light under the condition where a voltage is applied as indicated by a circle 43a" in FIG. 4.

Next, a method for producing the liquid crystal display device 200 will be described below.

In the same way as in Example 1, the flexible films 41a and 42a having the polarization properties are first produced. On a surface of the flexible film 41a of the substrate 41, the pixel electrodes 44, the bus lines 45, and the TFTs (not shown) are formed. On the other hand, on a surface of the flexible film 42a of the counter substrate 42, the black mask 46, the color filter 47, the protection layer 48 and the counter electrode 49 are formed. In a similar manner to that of Example 1, the substrate 41 and the counter substrate 42 are attached to each other by using the seal member composed of a photocurable resin so that the transmission axes of the flexible films 41a and 42a are orthogonal to each other.

Also in this example, the light irradiation step for curing the seal member is conducted just as described in detail in Example 1, so the explanation thereof will be omitted here. In this way, a panel 51 can be formed.

Subsequently, a mixture solution of the liquid crystal containing a chiral agent and the photopolymerizable prepolymer is filled into the gap between the attached substrates 41 and 42 of the panel 51. Herein, the photopolymers such as polyvinyl 4-methoxy-cinnamate may be employed. These photopolymers are polarization sensitive, and are photopolymerized along the polarization axis of the irradiated light. For further details, see Schadt et al., "Surface-induced Parallel Alignment of Liquid Crystals by Linearly Polymerized Photopolymers", Jap. Journal of Applied Physics Vol. 31, 1992, pp. 2155–2164.

Figure 8A:
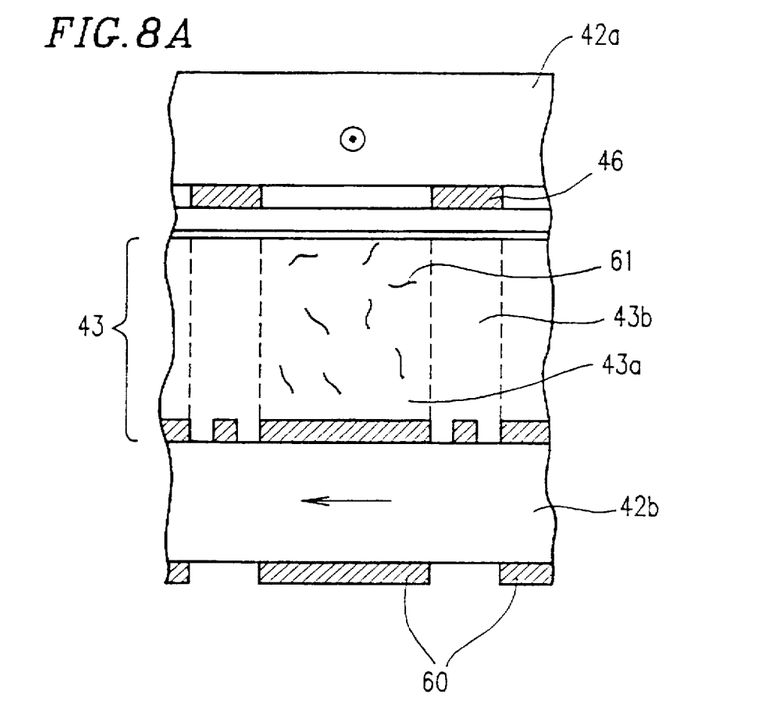
FIGS. 8A to 8C schematically show a photopolymerization step for producing the liquid crystal display device according to the second example.

Thereafter, a photomask 60 is placed on the panel 51 so that the light is irradiated onto only the portions of the mixture solution for forming the polymer phase 43b. Then the mixture solution is filled into the gap between the substrates and irradiated with the light transmitted through the substrate (a first light irradiation step). As shown in FIG. 4, the liquid crystal phase 43a contributing to the display is preferably formed on the pixel electrodes 44, and the polymer phase 43b is preferably formed on the portions other than the pixel electrodes 44. Accordingly, the polymer phase 43b is formed on the portions corresponding to the black mask 46. The light is irradiated from the substrate 41 side, since the light is shut out by the black mask 46 when the light for the photopolymerization is irradiated from the counter substrate 42 side. The photomask 60 has a complementary (i.e. negative/positive) relationship with the black mask 46 (FIG. 8A).

Figure 6:
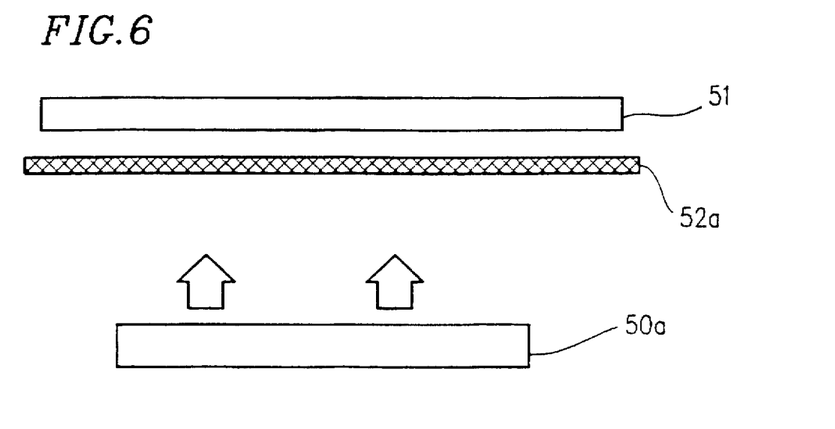
FIGS. 6 and 7 schematically show a method for irradiating light at a production step of the liquid crystal display device according to the second example.

If the light emitted from the light source 50a is irradiated directly onto the panel 51, the polarization properties of the flexible film 41a are degraded by the high-energy light. For the prevention of such degradation, a polarizer 52a is disposed between the light source 50a and the panel 51. The polarizer 52a is disposed so that the direction of the transmission axis (or the polarization axis) accords with that of the transmission axis of the flexible film 41a. The polarization axis of this polarized light is orthogonal to the polarization axis of the flexible film 42a of the counter substrate 42. However, the above-mentioned complemental location of the black mask 46 and the photomask 60 prevents this polarized light from being irradiated onto the flexible film 42a. Accordingly, the polarization properties of the flexible film 42a are not degraded.

The wavelength of the irradiated light may be set at an arbitrary value in accordance with the kind of polymer to be used and the cell gap. In this example, the prepolymer can be polymerized satisfactorily by using light with the wavelength set at a value shorter than 450 nm (i.e. a wavelength a little longer than that of a UV ray). In order to realize complete phase separation of the liquid crystal phase and the polymer phase, it is preferable to conduct the first light irradiation at a relatively weak intensity for a long time period. For example, the light irradiation may be conducted with a high pressure mercury lamp having an intensity of several mW/cm² to several tens mW/cm² for several minutes.

Figure 8B:
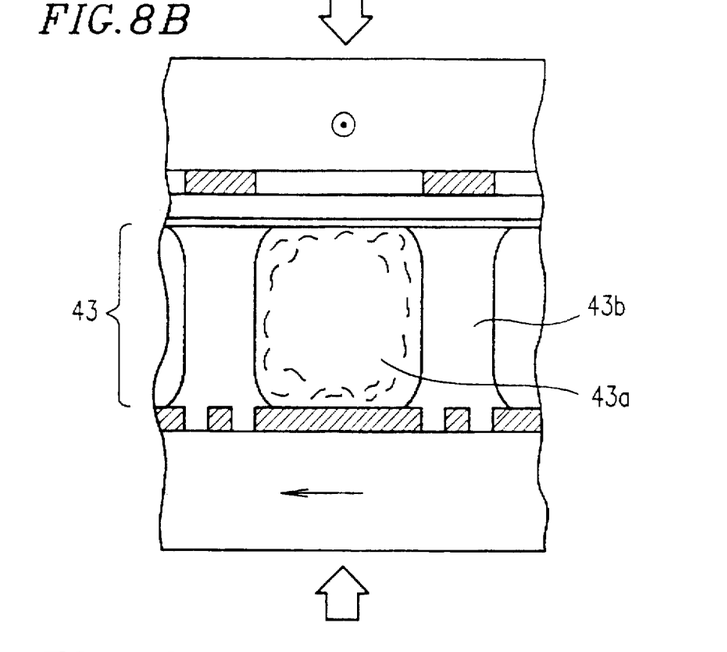

When the prepolymer is photopolymerized by irradiating the mixture solution of the liquid crystal and the polymer with the light, the proportion of the prepolymer 61 contained in the mixture solution is reduced. At the same time, the liquid crystal droplets of the liquid crystal phase are combined with each other. As the photopolymerization further proceeds, the liquid crystal phase emerges as a form of a large aggregation, and the prepolymers excluded outside from the aggregation mainly exist in the vicinity of the surface of the substrate (FIG. 8B).

When the prepolymer in the mixture solution has been polymerized by the ratio equal to or more than 90% and less than 100%, the light irradiation is stopped and the photopolymerization is interrupted. In this stage, in the display medium 43, the polymer phase 43b is formed where the light is irradiated, while the liquid crystal phase 43a is formed where the light is not irradiated (FIG. 8B). However, since the photopolymerization of the polymers is not completed, the prepolymer 61 is mixed even in the liquid crystal phase 43a.

Figure 7:
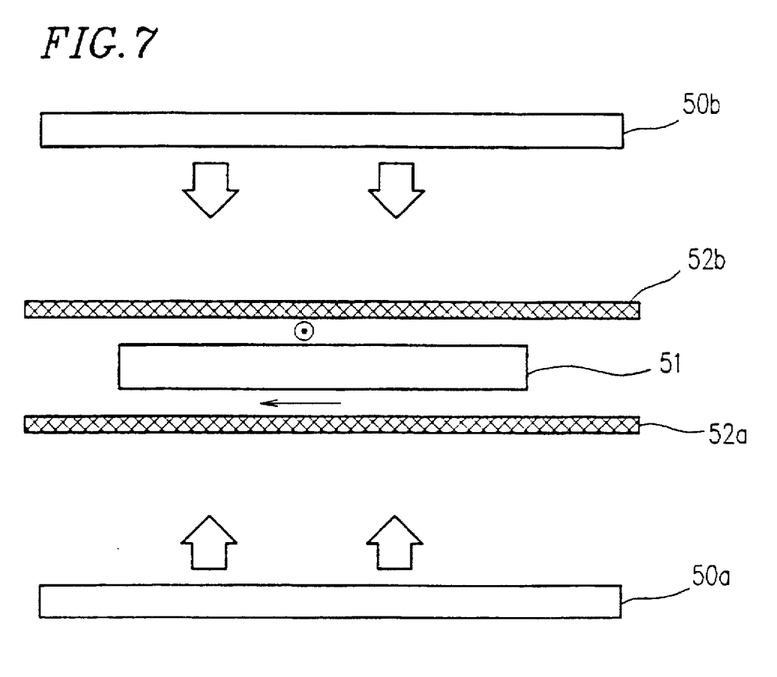

The photomask 60 is removed at this stage, and then the remaining prepolymer is photopolymerized by irradiating the light again (a second light irradiation step). As shown in FIG. 7, this light irradiation is conducted by using the two light sources 50a and 50b arranged in both sides of the panel 51. A polarizer 52a is disposed between the light source 50a and the panel 51, and, in the same way, the other polarizer 52b is disposed between the light source 50b and the panel 51. The polarizers 52a and 52b are disposed so that the directions of the respective transmission axes thereof are parallel to those of the transmission axes of the corresponding flexible films. The light may be irradiated from either one side of the panel 51 or against both sides of the panel 51.

Figure 8C:
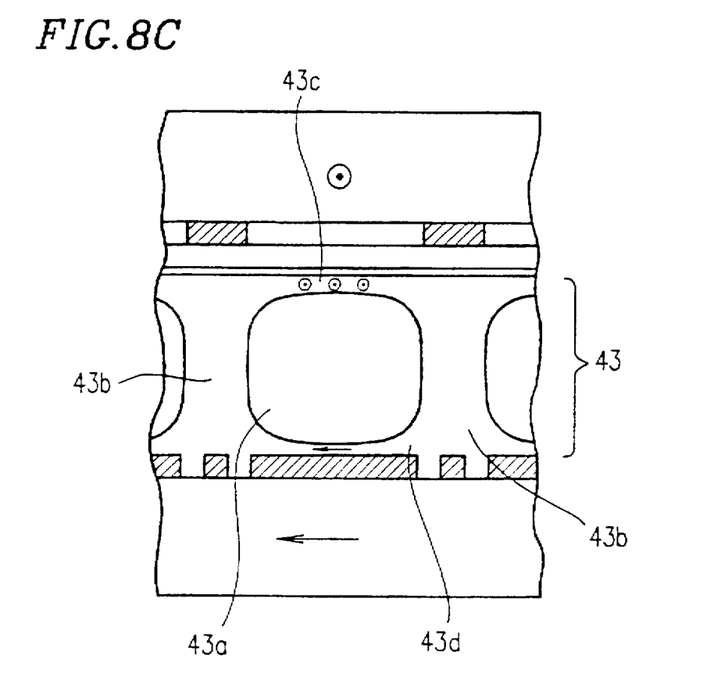

As described above, the prepolymers 61 exist mainly in the vicinity of the surfaces of the substrate 41 and 42. Accordingly, the remaining prepolymers form the polymer layers 43c and 43d on the surface of the substrates owing to the photopolymerization thereof (FIG. 8C).

Since a polarization sensitive polymer is used in this example, the prepolymer photopolymerizes with aligning along the polarization axis of the irradiated light. Accordingly, the polymer layers 43c and 43d formed on the surfaces of the substrates 41 and 42 have anisotropy in the molecular arrangement and the values of material properties (such as a dielectric constant, an elastic constant and a refractive index). As a result, the polymer layers 43c and 43d align the liquid crystal molecules in the vicinity of the respective surfaces of the substrates along the polarization direction of the irradiated light. In this example, the polarized light parallel to the transmission axes of the respective flexible films 41a and 42a are irradiated from both sides of the panel 51, and therefore, the orientation directions of the liquid crystal molecules in the vicinity of the surfaces of both of the substrates are orthogonal to each other. In addition, a chiral agent is added to the liquid crystal so that the rotation of the aligning direction of the liquid crystal molecules is either right-handed or left-handed. As a result, the liquid crystal molecules in the vicinity of the surface of one of the substrates are aligned along the transmission axis direction of the flexible film thereof, and then the aligning direction of the molecules rotate in one direction, i.e. to the right or to the left, so that the liquid crystal molecules in the vicinity of the surface of the other substrate are aligned in the direction orthogonal to the initial orientation direction. The liquid crystal molecules in the liquid crystal phase 43a are aligned by the polymer layers 43c and 43d in a similar manner to the liquid crystal molecules of an LCD operating in the TN mode.

In this case, it is not preferable that the polarized light irradiated from one side of the two polarizing films disposed orthogonally (the polarization axis of the polarized light is aligned with the transmission axis of the flexible film on the light irradiation side) reaches the other flexible film during the second light irradiation step. This is because the transmission axis of the other flexible film is different from (or orthogonal to) the polarization axis of the polarized light. Accordingly, it is preferable to control appropriately the intensity, irradiating time and the like of the irradiated light so that the polarized light is attenuated sufficiently before the light reaches the other flexible film, thereby preventing the degradation of the polarization properties of the other flexible film. The irradiated light may sufficiently have an intensity strong enough to cause the photopolymerization in the vicinity of the surface of the substrate on the light irradiation side.

As described above, an anisotropic polymer layer is produced by the use of the polarized light, the alignment of the liquid crystal molecules can be controlled by the polymer layers formed on the surfaces of the substrates. Accordingly, in this example, it is not necessary to form alignment films separately, so the rubbing treatment which is likely to cause an electrostatic breakdown of a device and the like is not required. In consequence, according to this example, the production process can be simplified, and in addition, the production yield can be improved.

In the above-mentioned Examples 1 and 2, flexible films having polarization properties are employed for both of the substrate and the counter substrate. Alternatively, one of the pair of substrates may be provided with such a flexible film having polarization properties.

As described above, according to the present invention, the polarized light is used in a light irradiation step of the production process, so that a liquid crystal display device provided with flexible films having polarization properties as substrates can be produced without causing the degradation of the polarization properties. As a result, even if the light irradiation step is included in the production process, it is possible to produce a liquid crystal display device provided with flexible films as base substrates, in which a substrate and a polarization plate are integrated, without causing the degradation of the polarization properties.

In addition, according to the present invention, the polymer can be produced by conducting the photopolymerization reaction with the polarized light, so that the aligning directions of the liquid crystal molecules can be controlled by the polymer layers thus produced. As a result, it is not necessary to form separately an alignment film by performing a rubbing treatment, etc. which is likely to cause an electrostatic breakdown of a device, so that not only the simplification of the production process but also the improvement of the production yield can be realized. Consequently, according to the above-mentioned production method, a liquid crystal display device of high quality can be produced under a simplified production process without any need for forming an alignment film.

Furthermore, providing ultraviolet ray cut layers on the flexible film which is not subjected to the UV-cut treatment after the light irradiation step prevents the degradation of the liquid crystal caused by the ultraviolet rays during the use of the liquid crystal display device after the fabrication.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: a pair of substrates facing each other; and a display medium sandwiched between the pair of substrates,     wherein at least one of the pair of substrates is a flexible film having polarizer properties and the display medium includes a liquid crystal phase and a polymer phase, the polymer phase includes polymer layer portions formed on inner surfaces of the pair of substrates and polymer binder portions connecting one of the polymer layer portions formed on one of the pair of substrates and a corresponding one of the polymer layer portions formed on another of the pair of substrates, the liquid crystal phase being formed between the polymer binder portions and between the corresponding polymer layer portions formed on the pair of substrates.

2. A liquid crystal display device according to claim 1, wherein the polymer layer portions have an anisotropy, whereby liquid crystal molecules contained in the liquid crystal phase are aligned.

3. A liquid crystal display device according to claim 2, wherein a direction of the anisotropy of the polymer layer portions is parallel to a direction of a polarization axis of the flexible film.

4. A liquid crystal display device according to claim 1 further comprising a shielding layer for cutting ultraviolet light on at least one outer surface of the pair of substrates.

5. A liquid crystal display device according to claim 1, wherein the polymer layer portions are formed by phase separation from a mixture solution including liquid crystal and photopolymerizing prepolymer by applying light to the mixture solution through the flexible film having polarizer properties, the light being linearly polarized in a direction parallel to a direction of the transmission axis of the flexible film.

6. A liquid crystal display device according to claim 5, wherein the polymer layer portions have an anisotropy in which an axis of the anisotropy is parallel to a polarization axis of the linearly polarized light.

* * * * *